United States Patent
Thomas et al.

(10) Patent No.: US 10,077,798 B2
(45) Date of Patent: Sep. 18, 2018

(54) TUNABLE TORQUE TRANSMITTING SHAFT

(71) Applicant: STEERING SOLUTIONS IP HOLDING CORPORATION, Saginaw, MI (US)

(72) Inventors: Steven M. Thomas, Saginaw, MI (US); Jon N. Miller, Merrill, MI (US); Eduardo R. Mondragon-Parra, Freeland, MI (US); Brian J. Kleinfeld, Saginaw, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 122 days.

(21) Appl. No.: 14/951,985

(22) Filed: Nov. 25, 2015

(65) Prior Publication Data

US 2016/0146245 A1    May 26, 2016

Related U.S. Application Data

(60) Provisional application No. 62/084,169, filed on Nov. 25, 2014.

(51) Int. Cl.
*F16C 3/02* (2006.01)
*F16D 1/12* (2006.01)

(52) U.S. Cl.
CPC .............. *F16C 3/023* (2013.01); *F16D 1/12* (2013.01); *Y10T 403/7031* (2015.01)

(58) Field of Classification Search
CPC ....... F16C 3/023; F16D 1/12; Y10T 403/7031

USPC ................................................. 464/97, 160
See application file for complete search history.

(56) References Cited

U.S. PATENT DOCUMENTS

| | | | |
|---|---|---|---|
| 2,590,169 A | 3/1952 | Fritz | |
| 2,703,847 A | 3/1955 | Kalikow | |
| 2,734,359 A | 2/1956 | Mulheim et al. | |
| 3,197,216 A * | 7/1965 | Jackson | F16D 3/06 403/359.4 |
| 4,552,544 A * | 11/1985 | Beckman | F16C 3/03 403/359.6 |

(Continued)

FOREIGN PATENT DOCUMENTS

| CN | 101466964 A | 6/2009 |
|---|---|---|
| GB | 2070194 A | 9/1981 |
| GB | 2165620 A | 4/1986 |

OTHER PUBLICATIONS

European extended Search Report for EP Application No. 15196256.0 dated Mar. 30, 2016.

(Continued)

*Primary Examiner* — Gregory John Binda
(74) *Attorney, Agent, or Firm* — Cantor Colburn LLP

(57) ABSTRACT

A torque transmitting shaft includes a first member and a second member. The first member has an inner surface that defines a plurality of engagement elements. The second member has a first end portion, a second end portion, and an intermediate portion. The first end portion of the second member defines a splined portion. Each member of the splined portion is received within corresponding engagement elements of the plurality of engagement elements. Each member of the splined portion includes a first protrusion that engages the inner surface of the first member.

8 Claims, 2 Drawing Sheets

(56) References Cited

U.S. PATENT DOCUMENTS

| | | | |
|---|---|---|---|
| 4,754,659 A | 7/1988 | Rietsch | |
| 5,720,102 A | 2/1998 | McClanahan | |
| 9,416,815 B2 | 8/2016 | Grimmer et al. | |
| 2011/0209961 A1* | 9/2011 | Yamamoto | F16D 1/101 464/182 |
| 2016/0123377 A1* | 5/2016 | Thomas | F16C 3/023 464/97 |

OTHER PUBLICATIONS

Chinese Office Action for related Chinese Application No. 2017092702852110; dated Sep. 30, 2017; 8 pages.
English Translation for related Chinese Application No. 2017092702852110; dated Sep. 30, 2017; 13 pages.

* cited by examiner

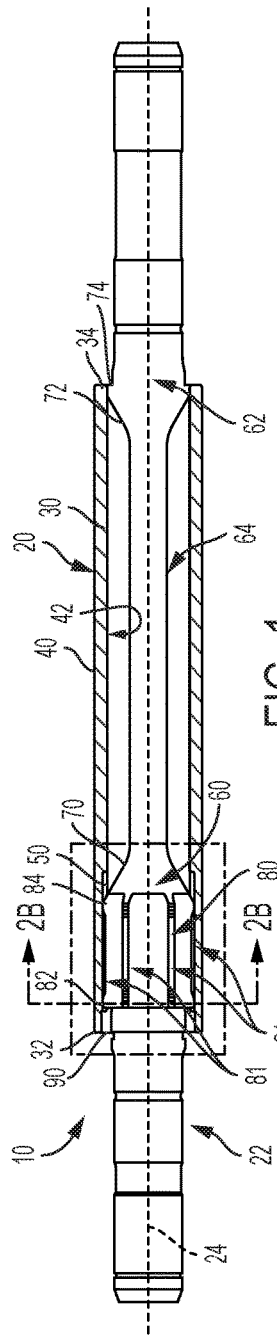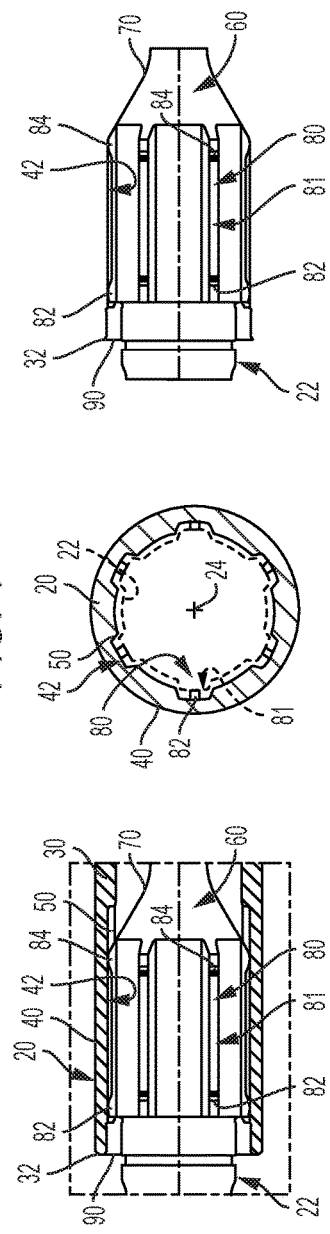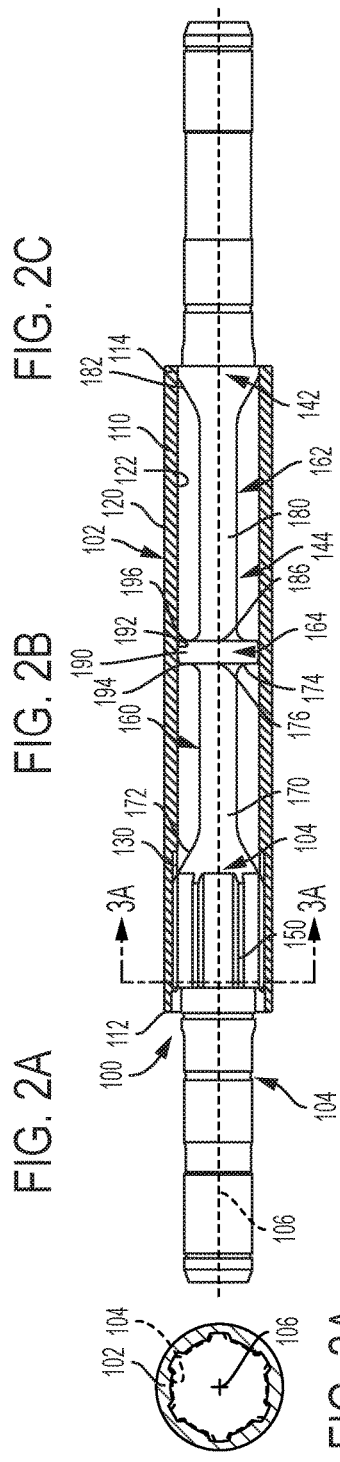

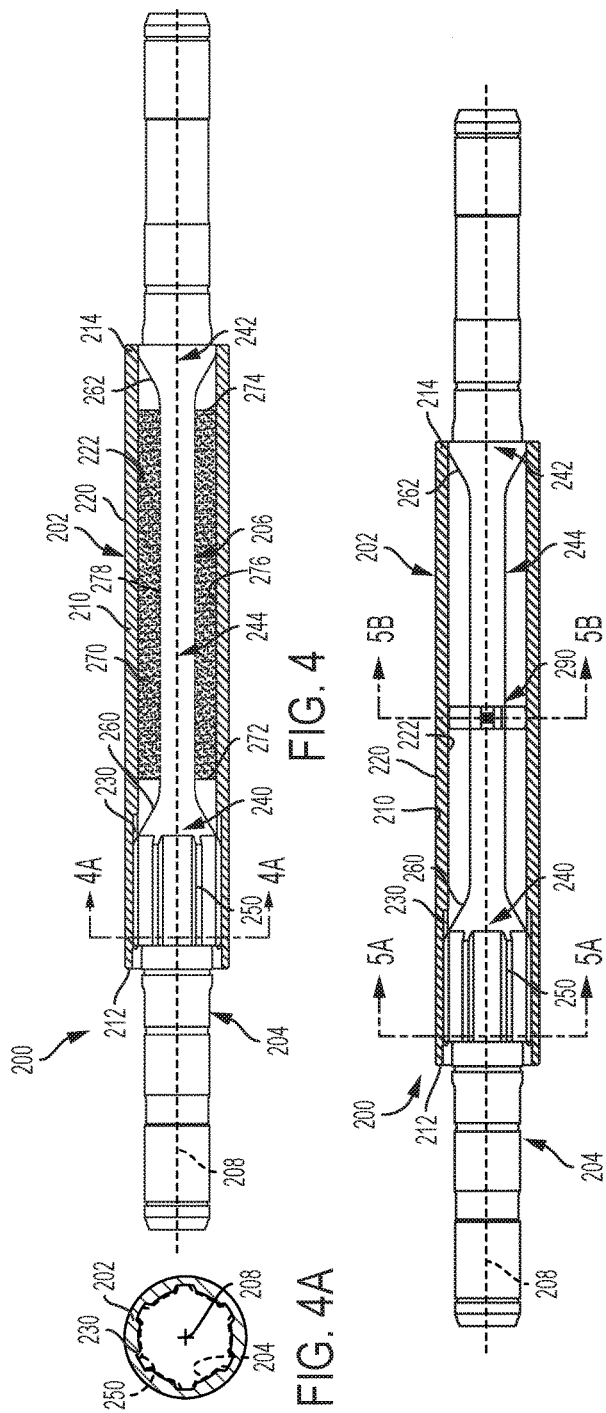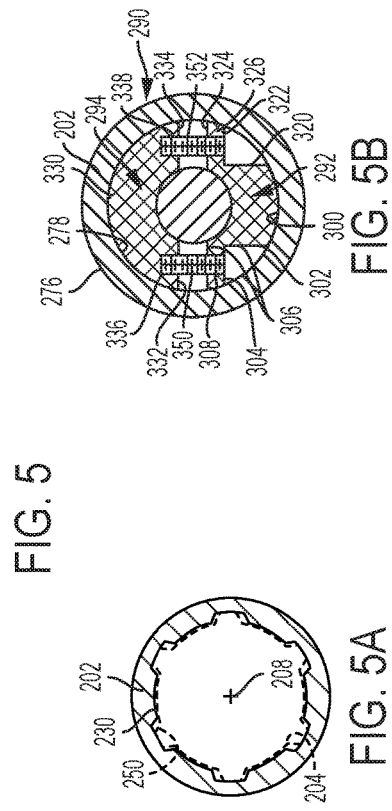

TUNABLE TORQUE TRANSMITTING SHAFT

CROSS-REFERENCES TO RELATED APPLICATIONS

This patent application claims priority to U.S. Provisional Patent Application Ser. No. 62/084,169, filed Nov. 25, 2014 which is incorporated herein by reference in its entirety.

BACKGROUND OF THE INVENTION

The present invention relates to a tunable torque transmitting shaft.

Vehicle drive lines transmit torque or power from a drive source, such as an internal combustion engine, to vehicle wheels. The torque or power may be transmitted through a series of driveline components such as gears, joints, and shafts. The driveline components provide a level of torsional stiffness to satisfy performance requirements. The driveline components also provide a level of compliance to reduce unwanted noise, vibration, or harshness. Some vehicle drive lines include driveshafts that are a simple one-piece torque transmitting shaft having a single torsional stiffness rate.

SUMMARY OF THE INVENTION

In at least one embodiment of the present invention, a torque transmitting shaft is provided. The torque transmitting shaft includes a first member and a second member. The first member extends along an axis and has an inner surface extending between a first end and a second end. The inner surface defines a plurality of engagement elements disposed proximate the first end. The second member extends along the axis and is received within the first member. The second member has a first end portion, a second end portion, and an intermediate portion extending between the first end portion and the second end portion. The first end portion of the second member defines a splined portion. Each member of the splined portion is received within corresponding engagement elements of the plurality of engagement elements. Each member of the splined portion includes a first protrusion that engages the inner surface of the first member.

In another embodiment of the present invention, a torque transmitting shaft is provided. The torque transmitting shaft includes a first member and a second member. The first member extends along an axis and has a body extending between a first end and a second end. The body has an inner surface. The second member extends along the axis and is received within the first member. The second member has a first end portion, a second end portion and an intermediate portion extending between the first end portion and the second end portion. The intermediate portion includes a first intermediate portion, a second intermediate portion, and a center support. The first intermediate portion has a first shaft portion extending to a first joining region. The second intermediate portion has a second shaft portion extending to a second join region. The center support has a first center face that abuts the first joining region, a second center face that abuts the second joining region, and a center support body extending between the first center face and the second center face.

In yet another embodiment of the present invention, a torque transmitting shaft is provided. The torque transmitting shaft includes a first member, a second member, and a center support assembly. The first member extends along an axis and has an inner surface extending between a first end and a second end. The inner surface defines a plurality of engagement elements disposed proximate the first end. The second member extends along the axis and is received within the first member. The second member has a first end portion, a second end portion, and an intermediate portion extending between the first end portion and the second end portion. The first end portion has a splined portion received within corresponding engagement elements of the plurality of engagement elements. The center support assembly is disposed about the intermediate portion of the second member. The center support assembly has an interior surface that engages an outer surface of the intermediate portion and an exterior surface that engages the inner surface of the first member.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a partial section view of a first embodiment of a torque transmitting shaft;

FIG. 2A is a detailed view of the first embodiment of the torque transmitting shaft;

FIG. 2B is a cross section through 2B-2B of FIG. 1;

FIG. 2C a detailed view of a portion of the first embodiment of the torque transmitting shaft;

FIG. 3 is a partial section view of a second embodiment of a torque transmitting shaft;

FIG. 3A is a cross-section through 3A-3A of FIG. 3;

FIG. 4 is a partial section view of a third embodiment of a torque transmitting shaft;

FIG. 4A is a cross section through 4A-4A of FIG. 4;

FIG. 5 is a partial section view of a fourth embodiment of a torque transmitting shaft;

FIG. 5A is a cross section through 5A-5A of FIG. 5; and

FIG. 5B is a cross section through 5B-5B of FIG. 5.

DETAILED DESCRIPTION

Referring now to the Figures, where the invention will be described with reference to specific embodiments, without limiting same, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Torque transmitting shafts are used to transmit torque or power from a transmission or transaxle to a vehicle wheel. FIGS. 1, 2A, and 2B illustrate a first embodiment of a torque transmitting shaft 10. The torque transmitting shaft 10 includes a first member 20 and a second member 22. The first member 20 extends along an axis 24. The first member 20 includes a body 30 extending between a first end 32 and a second end 34 disposed opposite the first end 32. The body 30 is a generally cylindrical body having an outer surface 40 and an inner surface 42.

The inner surface 42 defines an inner bore of the first member 20. The inner surface 42 defines a plurality of engagement elements 50. The plurality of engagement elements 50 are disposed proximate the first end 32. The plurality of engagement elements 50 are configured as a plurality of torque receiving grooves, torque receiving serrations, gear teeth, projections, or the like The second member 22 extends along the axis 24. The second member 22 is received within the first member 20. The second member 22 has a first end portion 60, a second end portion 62 disposed opposite the first end portion 60, and an intermediate portion 64. The intermediate portion 64 extends between the first end portion 60 and the second end portion 62.

The first end portion 60 has a first end portion diameter. The second end portion 62 has a second end portion diameter. The intermediate portion 64 has an intermediate portion diameter. The intermediate portion diameter is less than the first end portion diameter and the second end portion diameter such that the second member 22 has a dog bone shape when viewed from the side.

The first end portion 60, the second end portion 62, and the intermediate portion 64 are of a one-piece construction made of the same material. In at least one embodiment, the first end portion 60, the second end portion 62, and the intermediate portion 64 are provided as separate components that are joined together by a variety of joining methods. The intermediate portion 64 is made of a first material and the first end portion 60 and the second end portion 62 are made of a second material different from the first material. For example, the first end portion 60 and the second end portion 62 may be made of steel while the intermediate portion 64 is made of aluminum.

The intermediate portion 64 has a first transition region 70 and a second transition region 72. The first transition region 70 extends from a first end of the intermediate portion 64 towards the first end portion 60. The first transition region 70 provides a gradual transition from the smaller intermediate portion diameter to the larger first end portion diameter. The diameter of the first transition region 70 increases in a direction from the first end of the intermediate portion 64 towards the first end portion 60.

The second transition region 72 extends from a second end of the intermediate portion 64 towards the second end portion 62. The second transition region 72 provides a gradual transition from the smaller intermediate portion diameter to the larger second end portion diameter. The diameter of the second transition region 72 increases in a direction that extends from the second end of the intermediate portion 64 towards the second end portion 62. The second transition region 72 abuts a flanged surface 74 of the second end portion 62.

The first end portion 60 is configured to be rotatable relative to the first member 20. The first end portion 60 is rotatable relative to the first end 32 of the first member 20 while a torque is applied to the second member 22.

The first end portion 60 has a splined portion 80. The splined portion 80 is disposed between the first transition region 70 and an end of the first end portion 60. The splined portion 80 is configured as a plurality of torque transmitting grooves, torque transmitting serrations, gear teeth, or the like. Each member 81 of the splined portion 80 is received within or between corresponding engagement elements of the plurality of engagement elements 50. The splined portion 80 meshingly engages the plurality of engagement elements 52 transmit torque.

The torque transmitting shaft 10 is configured to provide multiple torsional stiffness rates while a torque is applied to the second member 22. The multiple torsional stiffness rates are based on geometry and material characteristics of the first member 20 and the second member 22 and a tangential clearance that exists between the plurality of engagement elements 50 and the splined portion 80, as shown in FIG. 2B.

A first torsional stiffness rate is provided by at least one of the first member 20 and the second member 22. The first torsional stiffness rate is provided while a first torque is applied to the second member 22 and while there is a tangential clearance between a member of the splined portion 80 and an engagement element of the plurality of engagement elements 50.

A second torsional stiffness rate is provided by at least one of the first member 20 and the second member 22. The second torsional stiffness rate is provided while a second torque, greater than the first torque, is applied to the second member 22 and while there is no tangential clearance between the member of the splined portion 80 and the engagement element of the plurality of engagement elements 50. The second torsional stiffness rate is greater than the first torsional stiffness rate.

Each member 81 of the splined portion 80 includes a first protrusion 82 and a second protrusion 84. The first protrusion 82 is disposed proximate an end of the splined portion 80. The first protrusion 82 is disposed proximate the first end 32 of the first member 20. The first protrusion 82 extends away from a top surface of a member 81 of the splined portion 80, as shown in FIG. 2C. The first protrusion 82 extends away from the axis 24. The first protrusion 82 is configured to engage a surface of a groove defined between or by the plurality of engagement elements 50, the surface being disposed parallel to the inner surface 42 of the first member 20, as shown in FIGS. 1 and 2A.

The second protrusion 84 is spaced apart from the first protrusion 82. The second protrusion 84 is disposed proximate the first transition region 70 of the intermediate portion 64. The second protrusion 84 is disposed proximate a second end of the first end portion 60 that is disposed opposite the first end of the first end portion 60. The second protrusion 84 extends away from the top surface of the member 81 of the splined portion 80, as shown in FIG. 2C. The second protrusion 84 extends away from the axis 24. The second protrusion 84 is configured to engage a surface of a groove defined between or by the plurality of engagement elements 50, the surface being disposed parallel to the inner surface 42 of the first member 20, as shown in FIGS. 1 and 2A.

The engagement of at least one of the first protrusion 82 and the second protrusion 84 with a surface of the groove defined between or by the plurality of engagement elements 50 of the inner surface 42 of the first member 20 improves or increases a bending stiffness of the first member 20 and the second member 22 of the torque transmitting shaft 10. At least one of the first protrusion 82 and the second protrusion 84 engaging a surface of the groove defined between or by the plurality of engagement elements 50 of the inner surface 42 of the first member while there is no radial clearance between at least one of the first protrusion 82 and the second protrusion 84 and a surface of the groove defined between or by the plurality of engagement elements 50 of the inner surface 42 of the first member 20. The engagement of at least one of the first protrusion 82 and the second protrusion 84 with a surface of the groove defined between or by the plurality of engagement elements 50 of the inner surface 42 of the first member 20 provides a bending support that increases the bending natural frequency of the torque transmitting shaft 10 such that a first bending stiffness is provided by at least one of the first member 20 and the second member 22 while a first bending moment is applied to the torque transmitting shaft 10 and while there is no radial clearance between at least one of the first protrusion 82 and the second protrusion 84 and a surface of the groove defined between or by the plurality of engagement elements 50 of the inner surface 42 of the first member 20.

The second end portion 62 of the second member 22 is fixedly positioned relative to the first member 20. The second end portion 62 of the second member 22 is fixedly positioned relative to the second end 34 of the first member 20 while an input torque is applied to the second member 22. The second end 34 of the first member 20 is fixed to the second member 22 proximate the flanged surface 74 of the second end portion 62.

The second end 34 of the first member 20 is joined to the second end portion 62 of the second member 22. The second end 34 of the second member 22 is joined to the second end portion 62 of the second member 22 by a variety of methods such as welding, press fit, swaging, fasteners, brazing, a pin extending through at least one of an end surface of the second end 34 or the flanged surface 74 of the second end portion 62 that is received within an opening defined by at least one of the end surface of the second end 34 or the flanged surface 74 of the second end portion 62.

In at least one embodiment, a sealing member 90 is provided. The sealing member 90 is disposed proximate the first end 32 of the first member 20. The sealing member 90 engages the first end 32 of the first member 20 and a portion of the first end portion 60 of the second member 22. The sealing member 90 is configured to inhibit foreign objects or particles from entering the inner bore of the first member 20. The sealing member 90 inhibits or prevents contaminants from contaminating the plurality of engagement elements 50 and the splined portion 80. The sealing member 90 is configured as an arcuate ring that engages the first end 32 of the first member 20, an end of the first end portion 60 of the second member 22, and a portion of the second member 22 that extends through the sealing member 90.

Referring to FIG. 3, a second embodiment of a torque transmitting shaft is shown. The torque transmitting shaft 100 includes a first member 102 and a second member 104. The first member 102 extends along an axis 106. The first member 102 includes a body 110 extending between a first end 112 and a second end 114 disposed opposite the first end 112. The body 110 is a generally cylindrical body having an outer surface 120 and an inner surface 122.

The inner surface 122 defines an inner bore of the first member 102. The inner surface 122 defines a plurality of engagement elements 130. The plurality of engagement elements 130 are disposed proximate the first end 112. The plurality of engagement elements 130 are configured as a plurality of torque receiving grooves, torque receiving serrations, gear teeth, projections, or the like.

The second member 104 extends along the axis 106. The second member 104 is received within the first member 102. The second member 104 has a first end portion 140, a second end portion 142 disposed opposite the first end portion 140, and an intermediate portion 144. The intermediate portion 144 extends between the first end portion 140 and the second end portion 142.

The first end portion 140 is configured to be rotatable relative to the first member 102. The first end portion 140 is rotatable relative to the first end 112 of the first member 102 while a torque is applied to the second member 104.

The first end portion 140 has a splined portion 150. The splined portion 150 is disposed between a first end and a second end of the first end portion 140. The splined portion 150 is configured as a plurality of torque transmitting grooves, torque transmitting serrations, gear teeth, or the like. Each member of the splined portion 150 is received within or between corresponding engagement elements of the plurality of engagement elements 130. The splined portion 150 meshingly engages the plurality of engagement elements 130 to transmit torque.

The torque transmitting shaft 100 is configured to provide multiple torsional stiffness rates while a torque is applied to the second member 104. The multiple torsional stiffness rates are based on geometry and material characteristics of the first member 102 and the second member 104 and a tangential clearance that exists between the plurality of engagement elements 130 and the splined portion 150, as shown in FIG. 3A.

A first torsional stiffness rate is provided by at least one of the first member 102 and the second member 104. The first torsional stiffness rate is provided while a first torque is applied to the second member 104 and while there is a tangential clearance between a member of the splined portion 150 and an engagement element of the plurality of engagement elements 130.

A second torsional stiffness rate is provided by at least one of the first member 102 and the second member 104. The second torsional stiffness rate is provided while a second torque, greater than the first torque, is applied to the second member 104 and while there is no tangential clearance between the member of the splined portion 150 and the engagement element of the plurality of engagement elements 130. The second torsional stiffness rate is greater than the first torsional stiffness rate.

In at least one embodiment, each member of the splined portion 150 is provided with at least one protrusion or protuberance. The at least one protrusion or protuberance extends away from a surface of each member of the splined portion 150 and engages the inner surface 122 of the first member 102. The engagement of the at least one protrusion or a turbulence improves or increases the bending stiffness of the first member 102 and the second member 104.

The second end portion 142 of the second member 104 is fixedly positioned relative to the first member 102. The second end portion 142 of the second member 104 is fixedly positioned relative to the second end 114 of the first member 102 while an input torque is applied to the second member 104. The second end 114 of the first member 102 is fixed to the second end portion 62 of the second member 104.

The second end 114 of the first member 102 is joined to the second end portion 142 of the second member 104. The second end 114 of the second member 104 is joined to the second end portion 142 of the second member 104 by a variety of methods such as welding, press fit, swaging, fasteners, brazing, a pin extending through at least one of an end surface of the second end 114 or the second end portion 142 that is received within an opening defined by at least one of the end surface of the second end 114 or the second end portion 142.

The intermediate portion 144 includes a first intermediate portion 160, a second intermediate portion 162, and a center support 164 disposed between the first intermediate portion 160 and the second intermediate portion 162. The first intermediate portion 160 includes a first shaft portion 170 extending along the axis 106 between a first transition region 172 and a first joining region 174.

The first transition region 172 extends from a first end of the first shaft portion 170 towards the first end portion 140. The first transition region 172 provides a gradual transition from a smaller first shaft portion diameter to a larger first end portion diameter. The diameter of the first transition region 172 increases in a direction from the first end of the first shaft portion 170 towards the first end portion 140.

The first joining region 174 extends from a second end of the first shaft portion 170 disposed opposite the first end of the first shaft portion 170 towards the second intermediate portion 162 and the center support 164. The first joining region 174 includes a fillet portion that tapers concavely to connect the first shaft portion 170 to the first joining region 174. The first joining region 174 includes a first face 176. The first face 176 faces towards the second intermediate portion 162 and the center support 164.

The second intermediate portion 162 includes a second shaft portion 180 extending along the axis 106 between a second transition region 182 and a second joining region 184.

The second transition region 182 extends from a first end of the second shaft portion 180 towards the second end portion 142. The second transition region 182 provides a gradual transition from a smaller second shaft portion diameter to a larger second end portion diameter. The diameter of the second transition region 182 increases in a direction that extends from the first end of the second shaft portion 180 towards the second end portion 142.

The second joining region 184 extends from a second end of the second shaft portion 180 disposed opposite the first end of the second shaft portion 180 towards the first intermediate portion 160 and the center support 164. The second joining region 184 includes a fillet portion that tapers concavely to connect the second shaft portion 180 to the second joining region 184. The second joining region 184 includes a second face 186. The second face 186 faces towards the first intermediate portion 160 and the center support 164.

The center support 164 extends along the axis 106. The center support 164 includes a center support body 190 having an exterior surface 192. The center support body 190 extends between a first center face 194 and a second center face 196. The first center face 194 abuts the first face 176 of the first joining region 174. The first center face 194 is joined to the first face 176 of the first joining region 174. The second center face 196 abuts the second face 186 of the second joining region 184. The second center face 196 is joined to the second face 186 of the second joining region 184.

The exterior surface 192 of the center support body 190 engages the inner surface 122 of the first member 102. The engagement of the exterior surface 192 of the center support body 190 with the inner surface 122 of the first member 102 improves or increases a bending stiffness of the first member 102 and the second member 104 of the torque transmitting shaft 100. The exterior surface 192 of the center support body 190 engages the inner surface 122 of the first member 102 while there is no radial clearance between the center support body 190 and the inner surface 122 of the first member 102. The engagement of the exterior surface 192 of the center support body 190 with the inner surface 122 of the first member 102 provides a bending support that increases the bending natural frequency of the torque transmitting shaft 100 such that a second bending stiffness is provided by at least one of the first member 102 and the second member 104 while a second bending moment is applied to the torque transmitting shaft 100 and while there is no radial clearance between the center support body 190 and the inner surface 122 of the first member 102.

Referring to FIGS. 4 and 4A, a third embodiment of a torque transmitting shaft is shown. The torque transmitting shaft 200 includes a first member 202, a second member 204, and a center support assembly 206. The first member 202 extends along an axis 208. The first member 202 includes a body 210 extending between a first end 212 and a second end 214 disposed opposite the first end 112. The body 210 is a generally cylindrical body having an outer surface 220 and an inner surface 222.

The inner surface 222 defines an inner bore of the first member 202. The inner surface 222 defines a plurality of engagement elements 230. The plurality of engagement elements 230 are disposed proximate the first end 212. The plurality of engagement elements 230 are configured as a plurality of torque receiving grooves, torque receiving serrations, gear teeth, projections, or the like.

The second member 204 extends along the axis 208. The second member 204 is received within the first member 202. The second member 204 has a first end portion 240, a second end portion 242 disposed opposite the first end portion 240, and an intermediate portion 244. The intermediate portion 244 extends between the first end portion 240 and the second end portion 242.

The first end portion 240 is configured to be rotatable relative to the first member 202. The first end portion 240 is rotatable relative to the first end 212 of the first member 202 while a torque is applied to the second member 204.

The first end portion 240 has a splined portion 250. The splined portion 250 is disposed between a first end and a second end of the first end portion 240. The splined portion 250 is configured as a plurality of torque transmitting grooves, torque transmitting serrations, gear teeth, or the like. Each member of the splined portion 250 is received within or between corresponding engagement elements of the plurality of engagement elements 230. The splined portion 250 meshingly engages the plurality of engagement elements 230 to transmit torque.

The torque transmitting shaft 200 is configured to provide multiple torsional stiffness rates while a torque is applied to the second member 204. The multiple torsional stiffness rates are based on geometry and material characteristics of the first member 202 and the second member 204 and a tangential clearance that exists between the plurality of engagement elements 230 and the splined portion 250, as shown in FIGS. 4A and 5A.

A first torsional stiffness rate is provided by at least one of the first member 202 and the second member 204. The first torsional stiffness rate is provided while a first torque is applied to the second member 204 and while there is a tangential clearance between a member of the splined portion 250 and an engagement element of the plurality of engagement elements 230.

A second torsional stiffness rate is provided by at least one of the first member 202 and the second member 204. The second torsional stiffness rate is provided while a second torque, greater than the first torque, is applied to the second member 204 and while there is no tangential clearance between the member of the splined portion 250 and the engagement element of the plurality of engagement elements 230. The second torsional stiffness rate is greater than the first torsional stiffness rate.

In at least one embodiment, each member of the splined portion 250 is provided with at least one protrusion or protuberance. The at least one protrusion or protuberance extends away from a surface of each member of the splined portion 250 and engages the inner surface 222 of the first member 202. The engagement of the at least one protrusion or a turbulence improves or increases the bending stiffness of the first member 202 and the second member 204.

The second end portion 242 of the second member 204 is fixedly positioned relative to the first member 202. The second end portion 242 of the second member 204 is fixedly positioned relative to the second end 214 of the first member 202 while an input torque is applied to the second member 204. The second end 214 of the first member 202 is fixed to the second end portion 242 of the second member 204.

The second end 214 of the first member 202 is joined to the second end portion 242 of the second member 204. The second end 214 of the second member 204 is joined to the second end portion 242 of the second member 204 by a variety of methods such as welding, press fit, swaging, fasteners, brazing, a pin extending through at least one of an end surface of the second end 214 or the second end portion 242 that is received within an opening defined by at least one of the end surface of the second end 214 or the second end portion 242.

The intermediate portion 244 extends between the first end portion 240 and the second end portion 242. The intermediate portion 244 has a first transition region 260 and a second transition region 262. The first transition region 260 extends from a first end of the intermediate portion 244 towards the first end portion 240. The first transition region 260 provides a gradual transition from the smaller intermediate portion diameter to the larger first end portion diameter. The diameter of the first transition region 260 increases in a direction from the first end of the intermediate portion 244 towards the first end portion 240.

The second transition region 262 extends from a second end of the intermediate portion 244 towards the second end portion 242. The second transition region 262 provides a gradual transition from the smaller intermediate portion diameter to the larger second end portion diameter. The diameter of the second transition region 262 increases in a direction from the second end of the intermediate portion 244 towards the second end portion 242.

The center support assembly 206 extends along the axis 208. The center support assembly 206 is disposed on the second member 204 and is received within the first member 202. The center support assembly 206 is disposed about the intermediate portion 244 of the second member 204.

The center support assembly 206 includes a generally cylindrical body 270 extending between a first center support assembly end 272 and a second center support assembly end 274 disposed opposite the first center support assembly end 272. The generally cylindrical body 270 includes an exterior surface 276 and an interior surface 278. The exterior surface 276 is configured to engage the inner surface 222 of the first member 20. The interior surface 278 is configured to engage a surface of the intermediate portion 244 of the second member 204.

The engagement of the exterior surface 276 of the generally cylindrical body 270 of the center support assembly 26 with the inner surface 222 of the first member 202 improves the bending stiffness of the torque transmitting shaft 200. The exterior surface 276 of the generally cylindrical body 270 of the center support assembly 26 engages the inner surface 222 of the first member 202 while there is no radial clearance between the exterior surface 276 of the generally cylindrical body 270 of the center support assembly 26 and the inner surface 222 of the first member 202.

In the embodiment shown in FIG. 4, the generally cylindrical body 270 extends substantially along the entire length of the intermediate portion 244 of the second member 204 such that the first center support assembly and 272 is disposed proximate the first end portion 240 of the second member 204 and the second center support assembly and 274 is disposed proximate the second end portion 242 of the second member 204. The first center support assembly end 272 is disposed proximate the first transition region 260. The second center support assembly end 274 is disposed proximate the second transition region 262.

Referring to FIGS. 5, 5A, and 5B, an alternative center support assembly 290 is provided with the torque transmitting shaft 200. As shown in FIG. 5B, the center support assembly 290 is a clamping assembly that includes a first support portion 292 and a second support portion 294. The first support portion 292 and the second support portion 294 are fixedly secured to the surface of the intermediate portion 244 of the second member 204. The first support portion 292 and the second support portion 294 are spaced apart from each other and do not engage each other.

The first support portion 292 has a first support portion exterior surface 300 that is provided with a first step surface 302 and a second step surface 304. The first step surface 302 extends substantially perpendicular to the first support portion exterior surface 300 and extends towards a first inner surface 306 of the first support portion 292. The second step surface 304 extends substantially perpendicular to the first step surface 302. The second step surface 304 defines a first fastener hole 310. The first fastener hole 310 extends completely through the first support portion 292. The first fastener hole 310 extends through the second step surface 304 and the first inner surface 306.

The first support portion exterior surface 300 is provided with a third step surface 320 and a fourth step surface 322. The third step surface 320 extends substantially perpendicular to the first support portion exterior surface 300 and extends towards a second inner surface 324 of the first support portion 292. The fourth step surface 322 extends substantially perpendicular to the third step surface 320. The fourth step surface 322 defines a second fastener hole 326. The second fastener hole 326 extends completely through the first support portion 292. The second fastener hole 326 extends through the fourth step surface 322 and the second inner surface 324.

The second support portion 294 has a second support portion exterior surface 330, a third inner surface 332, and a fourth inner surface 334. The third inner surface 332 is disposed substantially parallel to the first inner surface 306 of the first support portion 292. The third inner surface 332 defines a third fastener hole 336 that is proximately aligned with the first fastener hole 308 of the first support portion 292. The third fastener hole 336 is a blind hole that does not extend completely through the second support portion 294.

The fourth inner surface 334 is disposed substantially parallel to the second inner surface 324 of the first support portion 292. The fourth inner surface 334 defines a fourth fastener hole 338 that is proximately aligned with the second fastener hole 326 of the first support portion 292. The fourth fastener hole 338 is a blind hole that does not extend completely through the second support portion 294.

The first fastener hole 308 and the third fastener hole 336 are configured to receive a first fastener 350. The first fastener 350 extends through the first support portion 292 and extends into the second support portion 294 to couple the first support portion 292 to the second support portion 294.

The second fastener hole 326 and the fourth fastener hole 338 are configured to receive a second fastener 352. The second fastener 352 extends through the first support portion 292 and extends into the second support portion 294 to couple the first support portion 292 to the second support portion 294.

In at least one embodiment, the first support portion 292 and the second support portion 294 are joined to the intermediate portion 244 by a variety of joining methods that do not include fasteners. The first support portion 292 and the second support portion 294 are joined to the intermediate portion 244 by welding, brazing, or other joining methods known to those of ordinary skill in the art.

In at least one embodiment, additional center support assemblies are provided. The additional center support assemblies are spaced apart from the center support assembly 290 along the intermediate portion 244 of the second member 204. The additional center support assemblies provide a further increase in the bending stiffness and efficacy more effective coupling under bending of the first member 202 and the second member 204. The more effective coupling under bending enables the first member 202 and the second member 204 to be more resistant to bending.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A torque transmitting shaft comprising:
a first member extending along an axis, the first member having an inner surface extending between a first end and a second end, the inner surface defining a plurality of engagement elements disposed proximate the first end; and
a second member extending along the axis and received within the first member, the second member having a first end portion, a second end portion having a flanged surface that abuts the second end of the first member, and an intermediate portion extending between the first end portion and the second end portion, the first end portion of the second member defines a splined portion, each member of the splined portion is received within corresponding engagement elements of the plurality of engagement elements and each member of the splined portion includes a first protrusion that extends towards and engages a groove defined by the plurality of engagement elements.

2. The torque transmitting shaft of claim 1, wherein the first protrusion is disposed proximate an end portion of the splined portion.

3. The torque transmitting shaft of claim 1, wherein the first end portion of the second member has a first end portion diameter and the intermediate portion of the second member has an intermediate portion diameter less than the first end portion diameter.

4. The torque transmitting shaft of claim 3, wherein the second member has a first transition region extending from the intermediate portion to the first end portion.

5. The torque transmitting shaft of claim 4, wherein the first transition region has an increasing diameter, increasing in a direction from an end of the intermediate portion towards the first end portion.

6. The torque transmitting shaft of claim 5, wherein each member of the splined portion further includes a second protrusion spaced apart from the first protrusion.

7. The torque transmitting shaft of claim 6, wherein the second protrusion is disposed proximate the first transition region.

8. The torque transmitting shaft of claim 6, wherein at least one of the first protrusion and the second protrusion increases a bending stiffness of the first member and the second member while a bending moment is applied to the torque transmitting shaft.

* * * * *